United States Patent
Walter et al.

(10) Patent No.: US 9,537,891 B1
(45) Date of Patent: *Jan. 3, 2017

(54) POLICY ENFORCEMENT BASED ON DYNAMICALLY ATTRIBUTE-BASED MATCHED NETWORK OBJECTS

(71) Applicant: Palo Alto Networks, Inc., Santa Clara, CA (US)

(72) Inventors: Martin Walter, Mountain View, CA (US); Jeffrey Fitz-Gerald, Santa Clara, CA (US)

(73) Assignee: Palo Alto Networks, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/137,718

(22) Filed: Dec. 20, 2013

Related U.S. Application Data

(63) Continuation-in-part of application No. 13/246,472, filed on Sep. 27, 2011, and a continuation-in-part of application No. 13/528,748, filed on Jun. 20, 2012.

(51) Int. Cl.
*G06F 15/173* (2006.01)
*H04L 29/06* (2006.01)
*H04L 29/12* (2006.01)

(52) U.S. Cl.
CPC ............. *H04L 63/20* (2013.01); *H04L 61/15* (2013.01); *H04L 61/2076* (2013.01); *H04L 63/102* (2013.01)

(58) Field of Classification Search
CPC .... H04L 29/06; H04L 29/08072; H04L 63/10; H04L 63/0236; H04L 63/0263; G06Q 10/00; G06F 9/45512; G06F 21/577

USPC ...... 709/229, 236, 225, 249; 726/1, 11, 3, 9, 726/25; 707/102; 705/36, 6.36
See application file for complete search history.

(56) References Cited

U.S. PATENT DOCUMENTS

| | | | |
|---|---|---|---|
| 5,968,176 A * | 10/1999 | Nessett et al. | 726/11 |
| 6,453,419 B1 * | 9/2002 | Flint et al. | 726/3 |
| 6,484,261 B1 * | 11/2002 | Wiegel | 726/11 |
| 6,785,728 B1 * | 8/2004 | Schneider et al. | 709/229 |
| 6,826,698 B1 * | 11/2004 | Minkin et al. | 726/1 |
| 7,016,980 B1 * | 3/2006 | Mayer et al. | 709/249 |
| 7,194,529 B2 | 3/2007 | Kupiec et al. | |
| 7,900,005 B2 | 3/2011 | Kotsovinos et al. | |
| 8,185,573 B2 | 5/2012 | Izdepski et al. | |
| 8,224,918 B2 | 7/2012 | McCarthy et al. | |
| 8,341,732 B2 | 12/2012 | Croft et al. | |
| 8,364,852 B1 * | 1/2013 | Shukla et al. | 710/3 |
| 8,385,519 B2 | 2/2013 | Lindblad et al. | |
| 8,413,147 B2 | 4/2013 | Shen et al. | |
| 8,495,721 B1 * | 7/2013 | Moody et al. | 726/9 |
| 8,566,900 B1 * | 10/2013 | Bharali et al. | 726/1 |
| 8,775,625 B2 | 7/2014 | Narayanaswamy et al. | |
| 2003/0097589 A1 | 5/2003 | Syvanne | |
| 2003/0149781 A1 | 8/2003 | Yared et al. | |
| 2005/0159969 A1 * | 7/2005 | Sheppard | G06Q 10/00 705/7.36 |
| 2005/0198283 A1 * | 9/2005 | Ramamoorthy et al. | 709/225 |

(Continued)

*Primary Examiner* — Dustin Nguyen
(74) *Attorney, Agent, or Firm* — Van Pelt, Yi & James LLP

(57) ABSTRACT

A policy that includes an address group is received. The policy is compiled into a set of one or more rules. The compiling is performed at least in part by determining members of the address group. The compiling can further include substituting one or more IP addresses of the members for the address group. At least one rule included in the set of rules is enforced.

18 Claims, 8 Drawing Sheets

(56) References Cited

U.S. PATENT DOCUMENTS

| | | | |
|---|---|---|---|
| 2007/0005801 A1 | 1/2007 | Kumar et al. | |
| 2007/0226249 A1* | 9/2007 | Kacin | G06F 9/45512 707/102 |
| 2007/0250424 A1* | 10/2007 | Kothari | G06Q 10/00 705/36 R |
| 2008/0172366 A1* | 7/2008 | Hannel et al. | 707/3 |
| 2009/0138938 A1* | 5/2009 | Harrison et al. | 726/1 |
| 2009/0199177 A1 | 8/2009 | Edwards et al. | |
| 2009/0249438 A1* | 10/2009 | Litvin et al. | 726/1 |
| 2009/0249472 A1 | 10/2009 | Litvin et al. | |
| 2010/0107215 A1* | 4/2010 | Bechtel et al. | 726/1 |
| 2010/0287548 A1 | 11/2010 | Zhou et al. | |
| 2012/0030751 A1 | 2/2012 | Datta et al. | |
| 2012/0173757 A1* | 7/2012 | Sanden | 709/238 |
| 2012/0174186 A1 | 7/2012 | Aziz et al. | |
| 2012/0311568 A1 | 12/2012 | Jansen | |
| 2012/0311575 A1 | 12/2012 | Song | |
| 2012/0317610 A1 | 12/2012 | Kashyap | |
| 2013/0019277 A1* | 1/2013 | Chang et al. | 726/1 |
| 2013/0031544 A1 | 1/2013 | Sridharan et al. | |
| 2013/0198808 A1 | 8/2013 | Thomson et al. | |
| 2013/0247207 A1* | 9/2013 | Hugard, IV | G06F 21/577 726/25 |

* cited by examiner

```
     ┌ VM instance: vm-248
     │     name: DepartmentB1
     │     uuid: 42205b1b-0459-1bd5-b70e-ba57c45b9328                    ┌─208
     │     guestFullName: Microsoft Windows Server 2008 R2 (64-bit)
202 ─┤     guestId: windows7Server64Guest
     │     host: Host1 ──┌─214          ┌─210                ┌─212
     │     guest.net:
     │         ipAddress: 172.18.0.4, fe80::250:56ff:fea0:7cc3
     └     network: Engineering ┌ VM instance: vm-246
     │     name: DepartmentA1
     │     uuid: 4220f3c6-55fd-7490-d853-17026e111b19
     │     guestFullName: Ubuntu Linux (64-bit)
204 ─┤     guestId: ubuntu64Guest
     │     host: Host2
     │     guest.net:
     │         ipAddress: 10.5.125.26, fe80::250:56ff:fea0:7cc1
     └     network: Sales ┌ VM instance: vm-247
     │     name: DepartmentA2
     │     uuid: 4220d782-e086-618a-4206-627ae562aa95
     │     guestFullName: Other 2.6.x Linux (64-bit)
206 ─┤     guestId: other26xLinux64Guest
     │     host: Host1
     │     guest.net:
     │         ipAddress: 10.5.125.27, fe80::250:56ff:fea0:7cc2
     └     network: Engineering
```

```
<uid-message>
    <version>1.0</version>
    <type>update</type>
    <payload>
        <register>                          ⌒252
            <entry IP="10.5.125.27"/> ⌒254
            <tag>
                <member>production</member>
                <member>webserver</member>
            </tag>                          ⌒256
        </register>
    </payload>
</uid-message>
```

FIG. 2B

402
| Source | Destination | Application | Action |
|---|---|---|---|
| * | ProductionWebservers | HTTPS | ALLOW |

FIG. 4A

404
| Source | Destination | Application | Action |
|---|---|---|---|
| * | 172.16.0.4 | HTTPS | ALLOW |

FIG. 4B

406
408
| Source | Destination | Application | Action |
|---|---|---|---|
| * | 172.16.0.4 | HTTPS | ALLOW |
| * | 10.5.125.27 | HTTPS | ALLOW |

FIG. 4C

410
| Source | Destination | Application | Action |
|---|---|---|---|
| * | 172.16.0.4 | HTTPS | ALLOW |
| * | 10.2.25.2 | HTTPS | ALLOW |

POLICY ENFORCEMENT BASED ON DYNAMICALLY ATTRIBUTE-BASED MATCHED NETWORK OBJECTS

CROSS REFERENCE TO OTHER APPLICATIONS

This application is a continuation-in-part of co-pending U.S. patent application Ser. No. 13/246,472 entitled POLICY ENFORCEMENT WITH DYNAMIC ADDRESS OBJECT filed Sep. 27, 2011, which is incorporated herein by reference for all purposes. This application is also a continuation-in-part of co-pending U.S. patent application Ser. No. 13/528,748 entitled POLICY ENFORCEMENT IN A VIRTUALIZED ENVIRONMENT filed Jun. 20, 2012, which is also incorporated herein by reference for all purposes.

BACKGROUND OF THE INVENTION

Increasingly, businesses and other entities are using virtualized computing resources (whether running on purchased or leased computer hardware). Virtualized environments are generally very dynamic—virtual machines can easily be spun up, shut down, and moved. As one example, instead of maintaining a set of dedicated physical machines to serve web pages, a business may run at least some virtualized webservers. In such a scenario, if additional demand is experienced, additional virtualized webservers can quickly be brought online to handle the increased traffic. Unfortunately, virtualized environments can pose problems for firewall rules which tend to rely on static information, such as static IP addresses.

BRIEF DESCRIPTION OF THE DRAWINGS

Various embodiments of the invention are disclosed in the following detailed description and the accompanying drawings.

FIG. 2A illustrates an example of virtual machine information used in some embodiments.

FIG. 2B illustrates an example of an XML document used to report information in some embodiments.

FIG. 4A illustrates an example of a policy.

FIG. 4B illustrates a conceptualized set of compiled rules.

FIG. 4C illustrates a conceptualized set of compiled rules.

FIG. 4D illustrates a conceptualized set of compiled rules.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
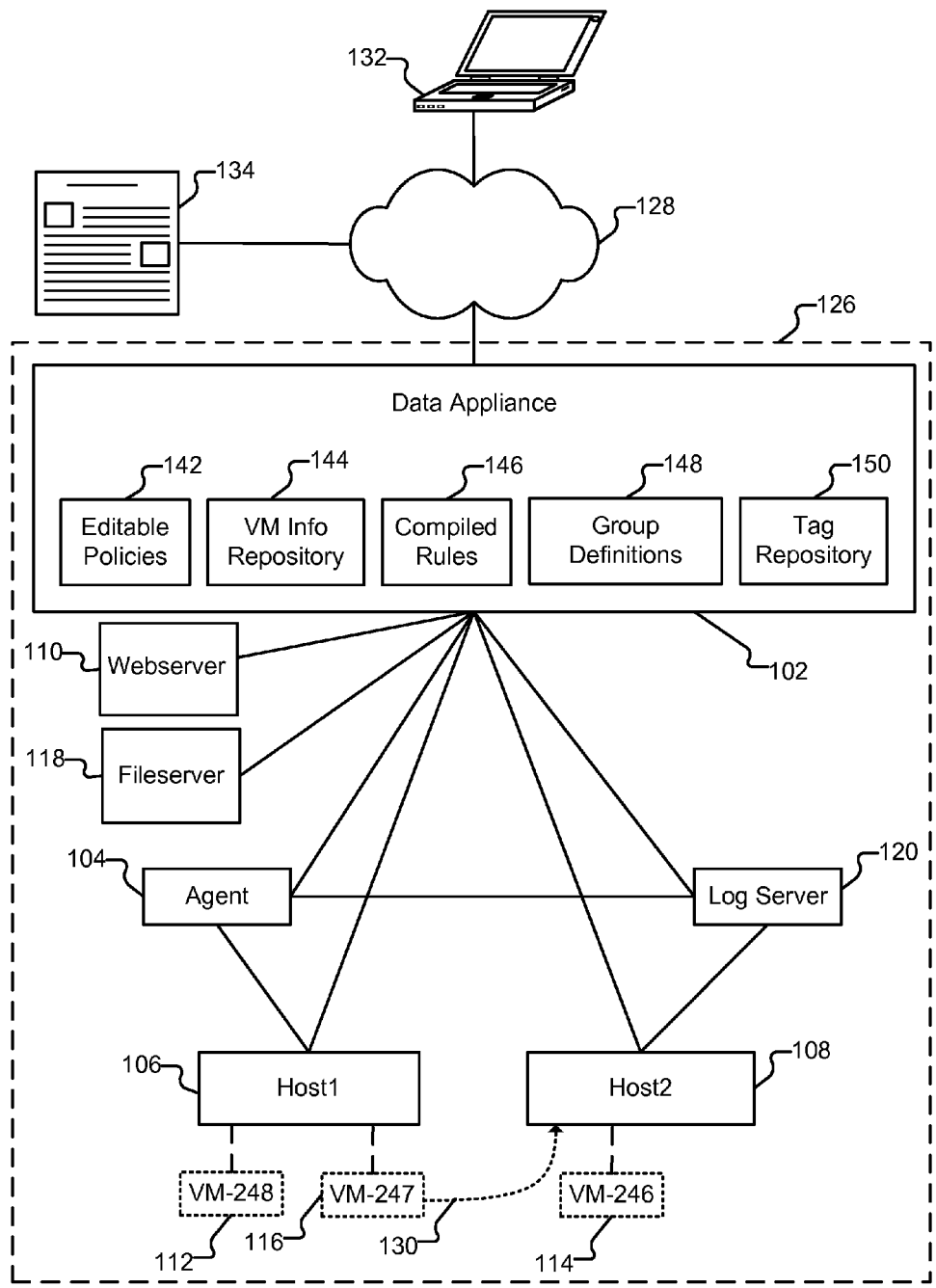
FIG. 1 illustrates an embodiment of an environment that includes virtualized computing resources.

FIG. 1 illustrates an embodiment of an environment that includes virtualized computing resources. In the example shown, enterprise network 126 (hereinafter referred to as belonging to the "ACME Company") includes various physical computing resources (e.g., servers 110 and 118). Server 110 is a dedicated webserver and server 118 is a dedicated fileserver. As shown, enterprise network 126 also includes three virtual servers (112-116), also referred to as "virtual machines," running on a total of two hosts (106 and 108). Virtual machine 116 is a webserver and is provisioned when server 110 is overloaded. Virtual machine 116 is decommissioned when not needed (e.g., when the load on server 110 returns to an acceptable level).

Communications between nodes inside network 126 (e.g., servers 110 and 118, and virtual servers 112-116) and resources outside of enterprise network 126 (e.g., laptop 132 or malicious site 134) pass (via one or more networks 128) through data appliance 102, which is placed at the perimeter of enterprise network 126. Such communications may take place using any appropriate communication protocol such as Hypertext Transfer Protocol (HTTP), Secure Sockets Layer (SSL), Common Internet File System (CIFS), and File Transfer Protocol (FTP). In the example shown in FIG. 1, data appliance 102 is a firewall and is configured to enforce policies (also referred to herein as "rules") with respect to the communications it receives. Other types of devices can also be configured to provide the functionality described herein as being performed by data appliance 102. Examples include routers, gateways, intrusion detection systems, intrusion prevention systems, and other appropriate devices (whether physical or virtualized).

Other network topologies can also be used in conjunction with the techniques described herein. Examples of such topologies include networks having multiple data appliances, networks where nodes are located across multiple data centers, and networks in which data appliance 102 is configured to enforce policies with respect to traffic that stays within enterprise network 126 instead of or in addition to outside traffic (i.e., traffic that flows through network 128).

As will be described in more detail below, policies enforced by data appliance 102 can be configured to apply to individual items and can also be configured to apply to groups. Further, group membership can be manually enumerated, and can also be dynamically generated based on match criteria. One example of a policy is as follows: allow access to all webservers (including physical webserver 110 and virtual webserver 116) via HTTPS to anyone (i.e., ACME employees, as well as an arbitrary member of the public using laptop 132, may all communicate with webserver 110 and virtual webserver 116, using HTTPS). Another example of a policy is as follows: allow access to virtual webserver 116 via SSH by members of the Engineering group, but deny access via SSH to anyone else. Yet another example of a policy is as follows: allow virtual machines that are running the Ubuntu Linux operating system to communicate with known-malicious website 134 (e.g., because they are hardened research images), deny all other nodes in network 126 access to website 134. In addition to allowing or denying access, other types of actions can also be specified in conjunction with a policy, such as a requirement that certain types of access be logged. Further, instead of or in addition to access/security policies, other types of policies can also be specified, as applicable (e.g., governing traffic shaping, quality of service, and routing of traffic).

As shown in FIG. 1, data appliance 102 includes a tag repository 150. The tag repository stores information pertaining to nodes in network 126, including arbitrary user-provided labels, and system attributes (collectively referred to herein as "tags"). As one example, suppose webserver 110 has associated with it in tag repository 150 the following labels: "webserver," "physical," and "production." The first tag indicates that the purpose of server 110 is that it is a webserver (instead of, e.g., a "mailserver" or "Linux workstation"). The second tag indicates that server 110 is a single physical machine (instead of, e.g., a "virtual" one). The third tag indicates that server 110 is in production use (instead of, e.g., "testing"). Various attributes of server 110 are also stored in tag repository 150, such as its IP address(es), its operating system/version, which applications it runs (e.g., "Apache" or "IIS"), and a unique identifier. As will be described in more detail below, each of the aforementioned tags can be used as "match criteria," for address group membership, and to enforce policies with respect to group members. In some embodiments, the data structure used to store tags in tag repository 150 includes the following: the tag text, an optional comment for the tag, and an optional color associated with the tag. Further, as will be discussed throughout, a given node can have multiple tags and can belong to multiple address groups, including overlapping address groups.

As a physical, production server, information pertaining to server 110 as stored in tag repository 150 is unlikely to change often. For example, server 110 is unlikely to stop being "physical," is unlikely to become a "mailserver," and is unlikely to be switched to "testing" from "production." Similarly, as a webserver it is unlikely to cease running "Apache" in favor of a different application, and while its IP address(es) could change, this will likely be a very rare event. Accordingly, in some embodiments, an administrator manually provides at least some of the information pertaining to server 110 to tag repository 150 and is responsible for keeping the information in tag repository 150 current (e.g., via a graphical interface or command line interface). In contrast to server 110, various information pertaining to virtualized servers may frequently change. If desired, an administrator can manually address such changes (e.g., by making edits to the contents of tag repository 150). In various embodiments, additional infrastructure is provided to streamline the collection and maintenance of such information. For example, also included in the environment shown in FIG. 1 are agent 104 and log server 120, both of which are configured to collect virtual machine information (hereinafter "VM information") from hosts, such as host 106, and to provide the information to data appliance 102.

Virtual machine information can be collected in a variety of ways. As a first example, in some embodiments, when a new virtual machine is provisioned, the host sends agent 104 (e.g., in conjunction with a startup script) virtual machine information that can include both attributes of the newly provisioned system, as well as any tags (e.g., specified in the script). This can be accomplished using an HTTP Representational State Transfer (REST) call that includes the IP address of the newly provisioned machine, and a set of tags. As a second example, agent 104 can use an application programming interface (API) provided by the host operating system on host 106 to extract information from the host about the virtual machines running on it (e.g., virtual machines 112 and 116). As another example, suppose host 108 lacks such an API. Host 108 can be configured to log information (including information pertaining to its virtual machines (e.g., 114) to a log server 120. Log server 120 can be configured to provide the information to agent 104, which in turn provides the information to data appliance 102. Log server 120 can also provide the information directly to data appliance 102 directly, as applicable. The collected VM information is stored in VM information repository 144 and is also used to populate tag repository 150 as applicable. In some embodiments, agent 104, log server 120, and/or other infrastructure are configured to collect information pertaining to physical servers in addition to or instead of collecting information pertaining to virtual servers.

As shown in FIG. 1, agent 104 is physically separate from data appliance 102. The functionality of agent 104 can also be incorporated into data appliance 102 (or another device) and standalone agent 104 (and/or log server 120) omitted as applicable. In some embodiments, appliance 102 makes available an API usable by hosts 106 and/or 108 to provide appliance 102 with tags (e.g., directly into tag repository 150). Further, while VM information repository 144 and tag repository 150 are shown as separate repositories in FIG. 1, the information contained within those respective repositories can be combined into a single repository (or partitioned into more than two repositories) and the techniques described herein adapted as applicable.

FIG. 2A illustrates an example of virtual machine information used in some embodiments. Depicted in FIG. 2A are three sets of records 202-206—corresponding to each of virtual machines 112-116, respectively. The records shown are examples of information that can be obtained from VMware vCenter. Similar records can be obtained from other virtualization platforms, such as XenServer, and the techniques described herein adapted as applicable. Further, as needed, the information collected by log server 120 can be translated, converted, or otherwise manipulated so that the VM information it obtains is provided to data appliance 102 in an appropriate format. Included in a given record, such as record 202, is various information pertaining to the virtual machine instance, such as the operating system (208), IPv4/IPv6 addresses (210, 212), and an identifier of the host (214). These are examples of attributes that are provided to tag repository 150, which, as discussed above, is also configured to store similar attributes for non-virtual nodes in some embodiments. Additional virtual machine information can be included in the records shown in FIG. 2A (e.g., tags such as "webserver") and such information can also be provided to appliance 102 separately (e.g., with a first process collecting the records shown in FIG. 2A, and a second process collecting additional tag information).

FIG. 2B illustrates an example of an XML document used to report information to appliance 102 in some embodiments. In particular, document 250 is an example of a document sent by host 106 as part of the provisioning of webserver 116. The document includes the current IP address of webserver 116 (252). The document also includes two tags (254, 256). As mentioned above, appliance 102 can be made aware of the contents of document 250 in a variety of ways. Further, the document can be sent in response to a variety of triggering events taking place, and can also be sent periodically. For example, virtual machine 116 can be configured to execute a startup script each time the virtual machine is started, that sends document 250 (with the appropriate IP address and tags) to data appliance 102. As another example, virtual machine 116 (or another entity, such as host 108) can be configured to send document 250 in conjunction with the migration of virtual machine 116 from host 106 to 108 (overwriting outdated information as applicable). As yet another example, virtual machine 116 can be configured to transmit document 250 to data appliance 102 once an hour. Other events can also be used to trigger the sending of document 250 to data appliance 102. For example, suppose virtual machine 112 is a virtualized desktop computer assigned to a member of the Engineering group at Acme. Each time the employee logs into virtual machine 112, a script executes that sends document 250 to data appliance 102.

Creating Address Groups

Suppose an administrator of appliance 102 (hereinafter referred to as "Alice") is responsible for maintaining policies in appliance 102 that govern communications involving all of Acme's webservers. As mentioned above, Acme maintains one dedicated production webserver 110, but when demand requires it, additional virtualized webservers (e.g., virtual webserver 116) are provisioned. Alice can manually configure policies applicable to server 110 (e.g., by referring to its specific IP address(es) in particular policies 142), and whenever virtualized webservers are needed, she can manually configure policies applicable to those virtualized webservers as well. Using the techniques described herein, however, Alice can also create an "address group," which, as will be described in more detail below, will allow her to specify policies applicable to a set of items, based on match criteria, without requiring her to know specific details about the set membership.

Figure 3:
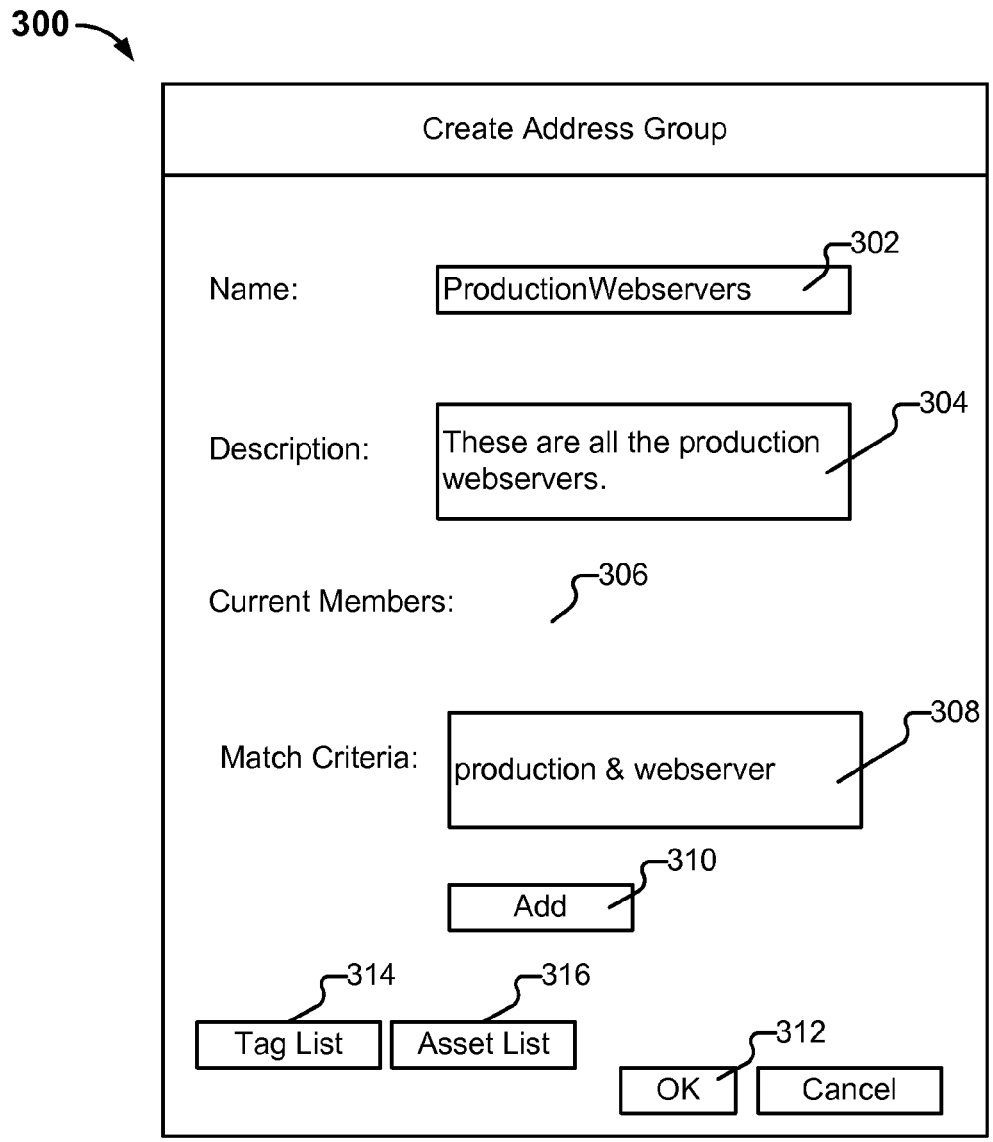
FIG. 3 illustrates an example of an interface.

FIG. 3 illustrates an example of an interface. In some embodiments, interface 300 is provided to Alice by appliance 102 in an administrative console. Suppose Alice would like to make a policy applicable to all production webservers (but not, for example, to testing webservers, or to other types of productions servers). To implement such a policy, Alice first creates an address group for production webservers (i.e., she first defines a group that she can then use in creating the policy).

In interface 300, Alice supplies a name for her new group ("ProductionWebservers") in region 302. She supplies a description of the group in region 304. In region 306, the current list of group members is shown. Since Alice has just started creating this group, no group members are present. To add members to the group, Alice interacts with region 308. In the embodiment shown, Alice can add group members in a variety of ways.

As shown in FIG. 3, Alice has entered a Boolean expression, "production & webserver," indicating that she would like to add all devices that have both a tag of "production" and a tag of "webserver." Suppose that at the time Alice is creating her group, webserver 110 is online and operating normally. Virtual webserver 116 is not needed (because demand on webserver 110 is low), and so it is not currently executing. Accordingly, when Alice selects "Add" box 310, only webserver 110 will appear in region 306 (as a current member of the group). In the event virtual webserver 116 is later provisioned, it will automatically be included in the "ProductionWebservers" group. Similarly, if other production webservers (whether physical or virtual) are brought online in network 126, they will automatically be added to Alice's group. In addition to specifying Boolean expressions in region 308, Alice can also explicitly add particular nodes (e.g., by providing an IP address, range of IP addresses, fully qualified domain name, or other appropriate identifier of the particular node(s)). Alice can also create nested groups by including an identity of an existing group in region 308. Once Alice has finished editing her new group, she clicks "OK" button 312 and her group is saved (e.g., into group definitions 148 of FIG. 1).

In some embodiments, interface 300 makes available various tools to help Alice determine how to define the members of the group she is creating. For example, if Alice clicks on "Tag list" button 314, a filterable list of all tags in tag repository 150 is shown to Alice and she can select which tags she would like to be populated into region 308 by interacting with the list and adding any applicable Boolean operators. As another example, if Alice clicks on "Asset list" button 316, a filterable list of all nodes in network 126 (also referred to herein as "objects") is shown to Alice and she can similarly identify particular network nodes she would like to be included. Appliance 102 can also make available other interfaces to assist Alice in creating and maintaining groups. For example, appliance 102 can make available (e.g., via a "View/Modify" interface) a listing of all groups included in definitions 148, and, if desired by Alice, detailed information about the membership of a given group (e.g., current number of members, current member identity, historical member identity, why a particular member was included (e.g., in the case of a Boolean expression), etc.).

The following are additional examples of groups that can be created using interface 300. Alice can create a group called "Engineering" which maps to the portion(s) of the enterprise network assigned to the Engineering department. One way Alice can populate the group is to provide the range of IP addresses assigned to the Engineering department. Alice can use other identifiers, such as fully qualified domain names and netmasks, instead of or in addition to IP addresses/ranges of IP addresses. Another example group is one that includes any virtual machine images running on host machine 108. One way Alice can populate this group is by including in region 308 the unique tag added by host machine 108 to tag repository 150 whenever starting virtual machines (e.g., tag="RunsOnHost2"). Yet another example group is hierarchical: Alice can make groups for various operating system variants (e.g., "Windows 7" and "Windows 8"). Alice can then make a "Windows" group by "OR"ing each of the variant groups together. In some embodiments, some groups are created by default by appliance 102 and need not be configured by Alice. As one example, groups defined based on system attributes, such as the "Windows 8" group, can be included in group definitions 148 by the manufacturer or other appropriate entity.

Dynamic Policies

FIG. 4A illustrates a conceptualized example of a policy. Policy 402, created by Alice and stored (142) on data appliance 102, states that anyone is permitted to access any production webserver using HTTPS. Note that Alice did not need to manually identify each of the nodes to which the policy should be applied (e.g., via IPv4 of IPv6 addresses or range of addresses as applicable) when creating the rule shown in FIG. 4A. Instead, she is able to create her policy using the abstracted address group object "ProductionWebservers" that she created in interface 300.

Policies, such as policy 402, are compiled (146) and, at runtime, used in enforcement by data appliance 102. Specifically, during compilation, the address group object ("ProductionWebservers") will be replaced with the IP address of each member of that group, based on the information stored in tag repository 150 (and VM information repository 144 as applicable). As will be described in more detail below, when group membership changes (whether the adding or subtracting of members, or changes to members), any applicable firewall rules will be updated.

FIG. 4B illustrates a conceptualized set of compiled rules. Again, suppose that only webserver 110 is currently operating (i.e., that virtual webserver 116 is not). In the example shown, policy 402 has been compiled, resulting in a single rule, since there is only one member of the ProductionWebservers group at compile time—webserver 110. Specifically, the IP address of webserver 110 (404) is present.

Suppose the load on webserver 110 increases, causing virtual webserver 116 to be provisioned. As part of the provisioning process, tags associated with webserver 116 are entered into tag repository 150. In response, appliance 102 detects a change to the ProductionWebservers group, and that a new rule needs to be compiled. FIG. 4C shows policy 402 as recompiled after virtual server 116 is provisioned. Specifically, the IP address of virtual server 116 now has an entry 408 (in addition to the existing entry 406 for webserver 110) indicating that HTTPS traffic to it is permitted. When webserver 116 (or any new server) is brought online, typically several policies will be implicated (e.g., allowing access to the server to anyone via SSH, allowing other kinds of access to the server via anyone in the Engineering department, etc.). Appliance 102 is configured to automatically recompile or otherwise refresh any additional such rules, as needed.

Now suppose virtual webserver 116, which is shown in FIG. 1 as being hosted by host 106, is migrated to host 108 as indicated by line 130. One reason for the migration is if host 106 has a hardware or other failure. The IP address of virtual webserver 118 changes as a result of the migration (i.e., from 10.5.125.27 to 10.2.25.2). FIG. 4D shows policy 402 as recompiled after virtual webserver 116 is migrated. Specifically, the IP address in 408 has been changed (410) to reflect the current IP address of virtual webserver 116 after migration.

Enforcing Policies

Figure 5:
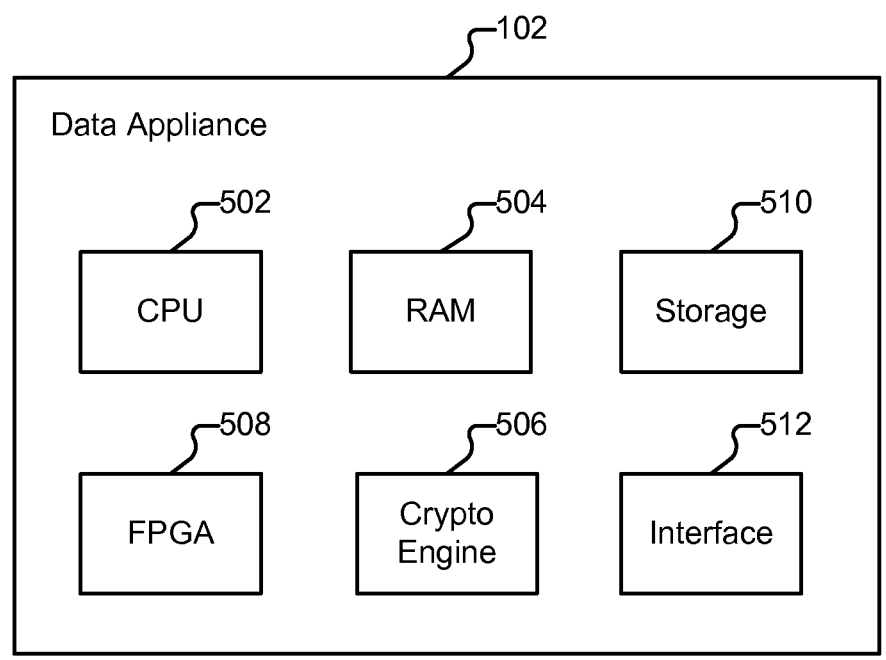
FIG. 5 illustrates an embodiment of a data appliance.

FIG. 5 illustrates an embodiment of a data appliance. The example shown is a representation of physical components that can be included in data appliance 102. Specifically, data appliance 102 includes a high performance multi-core CPU 502 and RAM 504. Data appliance 102 also includes a storage 510 (such as one or more hard disks), which is used to store policy and other configuration information. Data appliance 102 can also include one or more optional hardware accelerators. For example, data appliance 102 can include a cryptographic engine 506 configured to perform encryption and decryption operations, and one or more FPGAs 508 configured to perform signature matching, act as network processors, and/or perform other tasks. Also included in data appliance 102 is interface 512. In some embodiments, interface 512 exposes an application programming interface (API) via which devices, such as agent 104 and log server 120, keep data appliance 102 apprised of current VM information.

Figure 6:
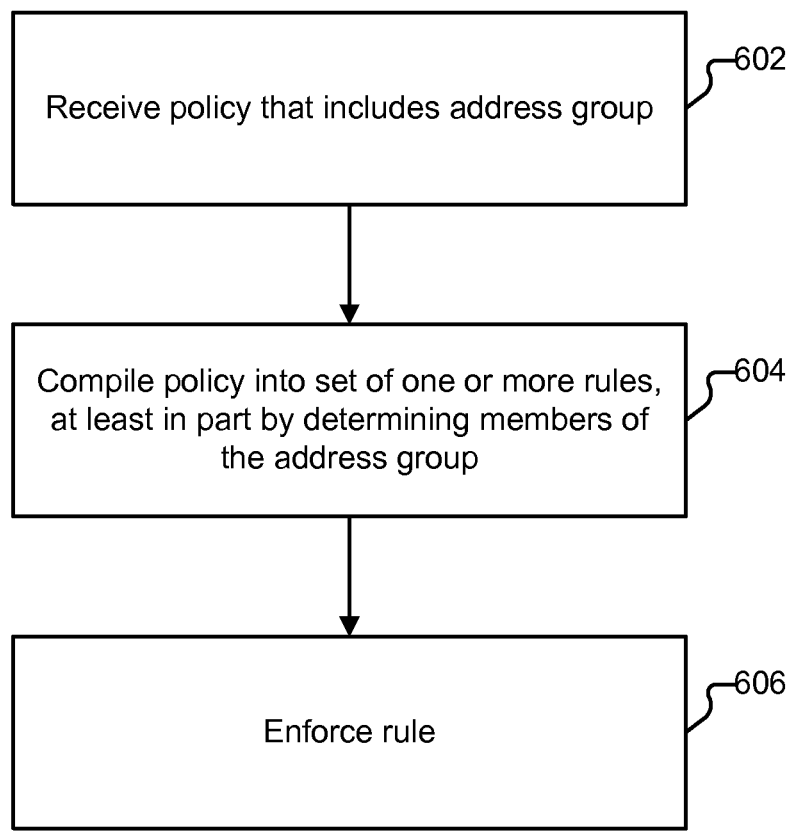
FIG. 6 illustrates an example of a process for enforcing a policy.

FIG. 6 illustrates an example of a process for enforcing a policy. In some embodiments the process shown in FIG. 6 is performed by data appliance 102. The process begins at 602 when a policy that includes an address group is received. As one example, such a policy is received at 602 when Alice clicks OK button 312 after populating interface 300 of FIG. 3.

At 604, the policy is compiled into one or more rules. As previously explained, appliance 102 uses various information (e.g., stored in repository 150, repository 144, policy repository 142, and/or group definitions 148) to compile rules (146) enforceable by data appliance 102. One example of the processing performed at 604 is seen in FIGS. 4A and 4B, where a policy that includes the address object "ProductionWebservers" (FIG. 4A) is compiled into one that uses the IP address of each of the group members (in FIG. 4B, a single IP address). Note that while FIG. 4A depicts a policy in which the address object appears in the "Destination" portion of the policy, address objects can also/instead be used in the "Source" portion.

Finally, at 606, the compiled rule is enforced. As one example, at 606, rule 404 is enforced with respect to physical webserver 110. As another example, once virtual webserver 116 comes online, a similar rule (408) will also be enforced with respect to virtual webserver 116. If virtual webserver 116 migrates, is decommissioned, or if another virtual webserver is brought online, appropriate rules can be recompiled, or added/removed, as applicable.

Figure 7:
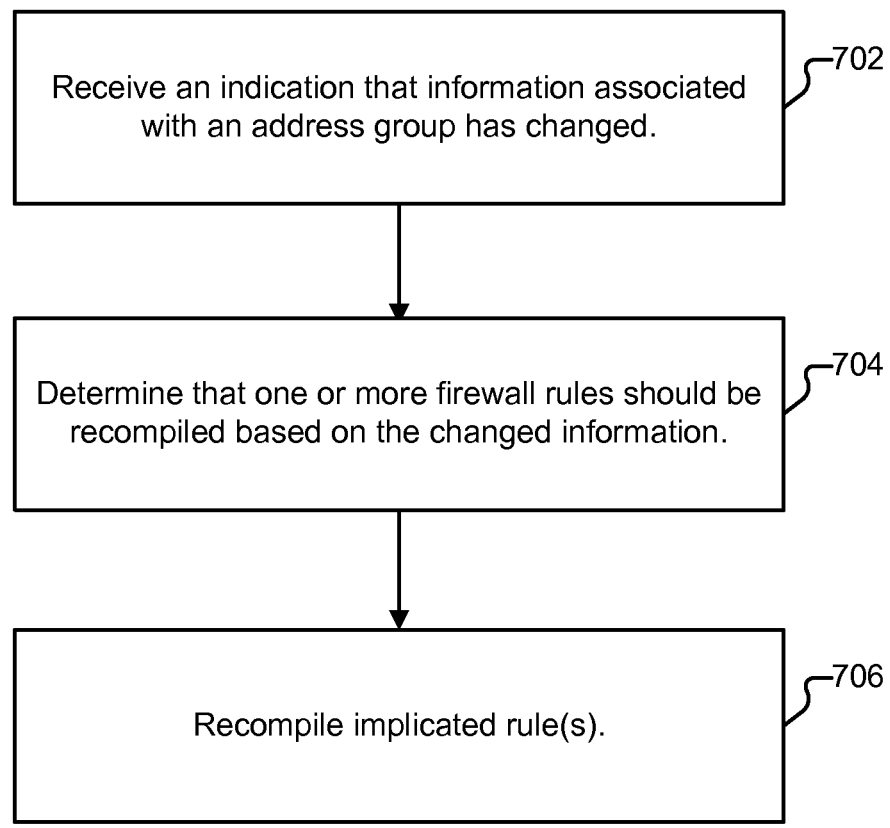
FIG. 7 illustrates an example of a process for updating a rule.

FIG. 7 illustrates an example of a process for updating a rule. In some embodiments the process shown in FIG. 7 is performed by data appliance 102. The process begins at 702 when an indication that information associated with an address group has changed is received. The indication can be received in a variety of ways. As one example, when virtual machine 116 is provisioned, host 106 may transmit information to appliance 102 (e.g., in the form of document 250 of FIG. 2B). As another example, when virtual machine 116 is migrated from host 106 to host 108, agent 104 may receive a push notification from host 106 regarding the migration event. Agent 104 then contacts host 108 (or log server 120, as applicable) to retrieve updated VM information for virtual machine 116 and provide it to data appliance 102 as an update. In some embodiments, when agent 104 receives the push notification from host 106, agent 104 instructs data appliance 102 to remove entry 202 from VM information repository 144 and tag repository 150. In that scenario, when the virtual machine image is brought up on host 108, host 108 (or log server 120, as applicable) notifies agent 104 (or data appliance 102, as applicable) of the presence of virtual machine 116 and a new record is created in VM information repository 144 and tag repository 150 as appropriate. Indications of changes in address group information can also be received in other ways. For example, agent 104 can be configured to periodically pull information from sources such as log server 120, perform a diff or other comparison, and provide updates to data appliance 102.

At 704, a determination is made as to whether any firewall rules need to be recompiled based on the changed information, and those rules are recompiled (706). As one example, when virtual machine 116 migrates from host 106 to host 108, rule 408 will need to be recompiled (as rule 410) so that policy 402 continues to be satisfied. As another example, other attributes of a system might change (e.g., upgrading the operating system), but, if such attributes are not used as filters (e.g., in any address groups), there will be no need to recompile any rules.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
  a processor configured to:
    receive a policy that includes an address group object, wherein the address group object abstracts a set of computing assets;
    compile the policy into a set of one or more rules, at least in part by substituting, for the address group object, a set of one or more IP addresses of computing assets determined to be members of an address group corresponding to the address group object, wherein determining the members of the address group includes querying a set of one or more repositories of computing asset information using a set of match criteria, wherein at least one criterion in the set of match criteria pertains to a characteristic of a computing asset;
    determine, based at least in part on a detected change to the address group, that at least one rule included in the set of rules should be recompiled;
    in response to the determination, perform a recompilation, including by substituting a first IP address in an out-of-date rule for a second IP address to create an updated rule; and
    enforce the updated rule at least one rule; and
  a memory coupled to the processor and configured to provide the processor with instructions.

2. The system of claim 1 wherein at least one match criterion included in the set of match criteria comprises a tag associated with an asset included in the set of computing assets.

3. The system of claim 2 wherein the tag is associated with a color.

4. The system of claim 1 wherein at least one computing asset included in the address group is manually enumerated.

5. The system of claim 1 wherein the determination is made in response to a provisioning event, in which an additional computing asset is included in the address group.

6. The system of claim 1 wherein the determination is made in response to a migration event, in which an IP address of an existing member of the address group is changed.

7. A method, comprising:
  receiving a policy that includes an address group object, wherein the address group object abstracts a set of computing assets;
  compiling the policy into a set of one or more rules, at least in part by substituting, for the address group object, a set of one or more IP addresses of computing assets determined to be members of an address group corresponding to the address group object, wherein determining the members of the address group includes querying a set of one or more repositories of computing asset information using a set of match criteria, wherein at least one criterion in the set of match criteria pertains to a characteristic of a computing asset;
  determining, based at least in part on a detected change to the address group, that at least one rule included in the set of rules should be recompiled;
  in response to the determination, performing a recompilation, including by substituting a first IP address in an out-of-date rule for a second IP address to create an updated rule; and
  enforcing the updated rule.

8. The method of claim 7 wherein the determination is made in response to a provisioning event, in which an additional computing asset is included in the address group.

9. The method of claim 7 wherein the determination is made in response to a migration event, in which an IP address of an existing member of the address group is changed.

10. A computer program product embodied in a tangible computer readable storage medium and comprising computer instructions for:
  receiving a policy that includes an address group object, wherein the address group object abstracts a set of computing assets;
  compiling the policy into a set of one or more rules, at least in part by substituting, for the address group object, a set of one or more IP addresses of computing assets determined to be members of an address group corresponding to the address group object, wherein determining the members of the address group includes querying a set of one or more repositories of computing asset information using a set of match criteria, wherein at least one criterion in the set of match criteria pertains to a characteristic of a computing asset;
  determining, based at least in part on a detected change to the address group, that at least one rule included in the set of rules should be recompiled;
  in response to the determination, performing a recompilation, including by substituting a first IP address in an out-of-date rule for a second IP address to create an updated rule; and
  enforcing the updated rule.

11. The method of claim 7 wherein at least one match criterion included in the set of match criteria comprises a tag associated with an asset included in the set of computing assets.

12. The method of claim 11 wherein the tag is associated with a color.

13. The method of claim 11 wherein at least one computing asset included in the address group is manually enumerated.

14. The computer program product of claim 10 wherein at least one match criterion included in the set of match criteria comprises a tag associated with an asset included in the set of computing assets.

15. The computer program product of claim 14 wherein the tag is associated with a color.

16. The computer program product of claim 10 wherein at least one computing asset included in the address group is manually enumerated.

17. The computer program product of claim 10 wherein the determination is made in response to a provisioning event, in which an additional computing asset is included in the address group.

18. The computer program product of claim 10 wherein the determination is made in response to a migration event, in which an IP address of an existing member of the address group is changed.

* * * * *